United States Patent [19]

Lindberg

[11] 3,931,381

[45] Jan. 6, 1976

[54] MOLD RELEASE METHOD FOR POLYURETHANE INTEGRAL-SKIN FOAM

[75] Inventor: Charles D. Lindberg, Scotia, N.Y.

[73] Assignee: The General Tire & Rubber Company, Akron, Ohio

[22] Filed: Sept. 9, 1974

[21] Appl. No.: 504,202

Related U.S. Application Data

[63] Continuation of Ser. No. 69,894, Sept. 4, 1970, abandoned, which is a continuation-in-part of Ser. No. 776,268, Nov. 15, 1968, abandoned.

[52] U.S. Cl. .......... 264/45.5; 106/271; 260/2.5 AZ; 264/53; 264/129; 264/233; 264/338; 264/DIG. 14
[51] Int. Cl.² .................... B29C 1/04; B29D 27/00
[58] Field of Search ............ 264/215, 255, 338, 45, 264/48, 51, 54, 45.5, 53; 106/271

[56] References Cited
UNITED STATES PATENTS

| | | | |
|---|---|---|---|
| 2,902,376 | 9/1959 | Beacher et al. | 264/213 |
| 3,046,177 | 7/1962 | Hankins | 264/338 |
| 3,101,244 | 8/1963 | Hood et al. | 264/54 |
| 3,165,567 | 1/1965 | Olson | 264/255 |
| 3,210,448 | 10/1965 | Szabat | 264/48 |
| 3,341,646 | 9/1967 | Britain | 264/213 |
| 3,413,390 | 11/1968 | Heiss | 264/54 |
| 3,492,394 | 1/1970 | Heihe | 264/45 |
| 3,523,918 | 8/1970 | Gonzalez | 264/48 |

*Primary Examiner*—Allan Lieberman

[57] ABSTRACT

In molding polyurethane integral-skin foam the foam tends to stick to the mold surface. Conventional mold release agents have not been found effective; they fail to provide full release of the molded product, are not durable enough to withstand more than one molding cycle, interfere with development of the integral skin, or plate onto the integral-skin thus necessitating solvent washing of the molded foam product. This invention is a method of preparing a mold to release flexible polyurethane integral-skin foam, free from skin damage and other defects, that is durable, i.e., that will permit many molding cycles before requiring replacement, and that permits the molded foam to be merely water washed to remove all traces of the mold release agent.

3 Claims, No Drawings

MOLD RELEASE METHOD FOR POLYURETHANE INTEGRAL-SKIN FOAM

This is a continuation of application Ser. No. 69,894, filed Sept. 4, 1970, now abandoned, which is a continuation-in-part of Ser. No. 776,268, filed Nov. 15, 1968, now abandoned.

BACKGROUND OF THE INVENTION

Field of the Invention

This invention relates to the field of mold release agents and methods of using them. More particularly, this invention relates to mold release agents for flexible polyurethane foam and to methods of using them particularly for the release of flexible polyurethane integral-skin foam.

There are three broadly acknowledged classes of polyurethane foam: rigid, semi-rigid, and flexible. This invention concerns the latter class. More specifically, it concerns a type of flexible polyurethane foam known as integral-skin foam.

Methods of preparing flexible polyurethane foam and integral-skin varieties thereof as well as specific formulations are well-known in the art. See, for example, "Polyurethane Foams" edited by T. T. Healy, AIRI, London, ILIFFE Books, Ltd., (1963), and "Plastics Engineering Handbook", Third Edition, Reinhold Publishing Corporation, (1960). See also, Michaels, C. R. and Cane, R. P., "Integral Skin Urethane Foam" S.A.E. Paper 680062, presented at Automotive Engineering Congress — Detroit, January, 1968, Wirtz, T. "Integral Skin Foam — A Process in Urethane Molding", paper presented at the Second S.P.I. International Cellular Plastics Conference, November, 1968, Zwolinski, L. M., "Molded Integral Skin Urethane Foam" S.P.E. ANTEC May, 1969, and Grieve, R. L., Bonk, H. W., and Nadeau, H. G., "A Development of Integral Skin Molded Urethane Foams for the Automotive Industry", S.P.E. ANTEC, May, 1969, all of which are incorporated herein by reference.

The difference between integral-skin polyurethane foam and other polyurethane foams is that, during development of the foam in the mold, a skin or noncellular layer is formed, in-situ, adjacent the mold surface that is joined to the interior of the foam through cell walls and ribs. This skin, being integral with the foam, in many cases eliminates the requirement of a separate wear-resistant skin over the finished foam such as is done with other polyurethane foams that do not contain integral-skin.

Difficulty has been encountered in molding integral-skin foam. The integral skin formed in-situ during development of the foam is susceptible to damage from many mold release agents; many of the conventional mold releases inhibit skin development or produce wrinkles and other defects. In addition, the integral skin is quite tender when newly formed, and since many molded foam products are only partially cured in the mold, removal of the foam may cause the skin to tear if less than perfect release is obtained. Further still, many common mold release agents are not very durable and not only must the mold be cleaned and recoated after each molding cycle but the foam product must be cleaned to remove traces of release agent that has plated onto it and that will impair subsequent painting, decorating, or finishing.

The use of polytetrafluoroethylene polymer coatings on mold surfaces is well-known in the art. Furthermore, these polymeric coatings have been used in conjunction with silicone oil mold releases, see U.S. Pat. No. 3,341,646. Still further, waxes have been known to be used in molding, especially polyurethane foam molding, see U.S. Pat. No. 3,101,244. Waxes, however, are softened or melted to effect release and thus require replacement on the mold surface after each molding cycle and also require the molded articles to be solvent washed to remove traces of the wax that has plated thereon. In addition, many mold release agents, while inert to most molding compositions, are acutely attacked by the polyurethane foam reactants, especially the polyisocyanate moiety. Mold release agents that contain (Zerewitinoff) active hydrogens such as hydroxyl groups and amine groups will be affected to varying degrees by these reactive elements in the foam formulation and may well damage the proper development of the foam or cause sticking in the mold. By and large then, the art recognizes not only the difficulties involved in preparing molds for molding polyurethane polymers but recognizes the singularity of mold release problems vis-a-vis specific types of polyurethanes such as elastomers, foams, etc., see U.S. Pat. No. 3,413,390.

In addition to the problem of providing the right kind of mold release agent, other factors influence the situation. Integral skin polyurethane foam uses little, if any, water in the formulations, the main blowing agent being a low boiling hydrocarbon compound such as Freon. Also, integral-skin foam is formulated to a higher density than non-integral skin foam, specifically to provide sufficient polymer for the formation of the skin. These formulation factors make integral-skin foam very costly with respect to materials. To maintain the overall cost competitive with non-skin foam, molding costs must be minimized. This means that mold preparation, molding cycle time, and foam clean-up be reduced. Thus, a mold release agent that must be replaced after each molding cycle cannot be tolerated, nor can a mold release agent that must be additionally heated to be softened or melted to effect release. Mold release agents that plate out heavily on the molded product and require solvent washing also cannot be tolerated. The art heretofore has not found a mold release that satisfies all these aforementioned problems and thus integral-skin polyurethane foam has not found wide commercial acceptance.

This invention is a method of preparing a mold to release flexible polyurethane integral-skin foam in a near perfect surface condition wherein the mold release agent is sufficiently durable to permit up to ten mold cycles prior to renewing. Furthermore, the mold release agent of this invention does not require softening or melting to effect release and does not break away from the mold surface and stick to the integral skin of the foam. Moreover, the minuscule amount of release agent that does adhere to the skin is conveniently washed away from the product by a mere warm water flushing.

Therefore, the main object of this invention is a method of preparing a mold surface that will release flexible polyurethane integral-skin foam therefrom without pinholes or other damage to the skin. Other objects of the invention include a mold release composition that is sufficiently durable to permit a plurality of molding cycles to be accomplished before it needs replaced; a method that permits molding of integral-skin polyurethane foam such that the minuscule traces of mold release that adhere to the molded article may be easily washed therefrom with water; and a method that does not inhibit or interfere with the proper development of the integral-skin foam on the molded polyurethane article.

SUMMARY OF THE INVENTION

This invention concerns a method of preparing a mold to release flexible polyurethane integral-skin foam therefrom comprising applying a continuous coating of a fused polytetrafluoroethylene polymer to the mold surface, applying a thin film of a liquid mixture comprising (by weight) from one to ten parts of a hydrocarbon wax having a melting point of about 210°F., an acid number of zero and a saponification number of zero, from 7 to 26 parts of sodium di(2-ethylhexyl) sufosuccinate and from 330 to 300 parts of a solvent for the wax and the sodium di(2-ethylhexyl) sulfosuccinate over the coating of fused polytetrafluoroethylene polymer, and drying the film prior to injecting the mixture of foam reactants into the mold.

DESCRIPTION OF THE PREFERRED EMBODIMENT

In this method of mold preparation, one first starts with a foam mold. These molds may be made from a variety of materials such as plastic, rubber, or metal, with the latter the most widely used, particularly beryllium-copper alloys. In addition, they may be open-top or close-top as the invention is fully operable with either configuration. Still further, the mold may be horizontally disposed or vertically disposed, used in a continuous process or discontinuous process, and may be of virtually any size desired. All of these types of molds will perform operably with respect to the invention disclosed herein and, therefore, all are fully contemplated in the invention.

First, onto the surfaces of the mold is applied a continuous coating of a fused polytetrafluoroethylene polymer. Polytetrafluoroethylene polymers are well-known in the art and are widely used where chemical resistance and lubricity are required. A quite popular polytetrafluoroethylene polymer is sold under the trademark, "Teflon" and manufactured by E. I. du Pont de Nemours & Co., Inc. There are many known processes for applying the continuous coating of fused polytetrafluoroethylene polymer to the mold surface such as rolling the polymer into tape form, pressing the tape onto the mold surface and heating the tape to about 400°C. to sinter it into a continuous coating. Another method is to form a suspensoid of polymer particles, which is a super-fine suspension of the particles in a volatizible liquid, flow this suspensoid over the surface of the mold, evaporate the liquid and sinter the deposited particles into a continuous coating. Preferred polytetrafluoroethylene polymer coatings are Tufram finishes and Nedox finishes. Tufram is a trademark of the General Magnaplate Corporation, Linden, N.J., for a polytetrafluoroethylene polymer coating that is produced by a proprietary process wherein an aluminized mold surface is converted, to a predetermined depth, to aluminum oxide ($Al_2O_3.H_2O$) and then impregnated with polytetrafluoroethylene particles under one micron in size. The process then causes the aluminum crystals at the surface to expand forming porous hydroscopic crystals that permanently interlock with the polytetrafluoroethylene particles and form a continuous lubricating surface of polymer. Nedox is a trademark of the same corporation for another polytetrafluoroethylene polymer coating that is produced by a proprietary process wherein a hard surface of chrome-nickel alloy is electrodeposited on any ferrous or copper alloy mold surface. The surface is then treated to accept a controlled infusion of polytetrafluoroethylene particles to form a continuous lubricating surface. Integral-skin polyurethane foam articles do not release easily from molds having these types of finishes and it is the combination of a polytetrafluoroethylene finish and the specific mold release agent disclosed herein that provides the beneficial aspects with respect to molding these foams.

Over top of this continuous coating of polytetrafluoroethylene polymer is applied a thin film of a liquid mixture comprising (by weight) from 1 to 10 parts of a hydrocarbon wax, from 7 to 26 parts of sodium di(2-ethylhexyl) sulfosuccinate, and from 330 to 300 parts of a solvent for both the wax and the sodium di(2-ethylhexyl) sulfosuccinate.

The hydrocarbon wax usable in this invention is characterized by having a melting point between 200° to 220°F. and preferably 210°F. and being insensitive to the reactions occurring in the mold. Preferably, the hydrocarbon wax should have an acid number near zero and a saponification number near zero which would place it in the form of a pure hydrocarbon wax that does not have reactive hydrogens such as hydroxyl groups, carboxyl groups, amine groups, etc. A preferred type of wax with properties within the limits disclosed above is marketed under the trademark Rock F. T. Wax by the International Wax Refining Company, Inc., and has a melting point of 210°F., an acid number of zero, a saponification number of zero, and is white in color.

Sodium di(2-ethylhexyl) sulfosuccinate is already known in the art as a suspension agent and is marketed under the trademark, "Aerosol OT", by American Cyanamid Company. It is a waxy solid having an APHA color at 50 percent solids of 100, an acid number of 2.5 max., an iodine number of 0.25 max., and a moisture content of 2.0 percent max. In addition, it has a molecular weight of 444, a melting point of 153°–157°C., is anionic, miscible with water, soluble in polar organic solvents and nonpolar organic solvents, and has the structural formula

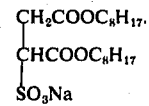

It should be specifically noted that sodium di(2-ethylhexyl) sulfosuccinate is an ester that is inert to the reactions involved in forming the polyurethane foam; i.e., the reaction between the polyisocyanate and the polyol, the reaction between the amine and the polyisocyanate, and reactions between the products of these reactions. Specifically, it should be noted that sodium di(2-ethylhexyl) sulfosuccinate does not contain amine groups that would be reactive with the polyisocyanate. If this were so, there would be brought into play other factors that may well deteriorate the quality of the integral-skin formed in the mold.

The hydrocarbon wax and the sodium di(2-ethylhexyl) sulfosuccinate are dissolved and diluted in a solvent for application to the surface of the mold. When diluted with from 330 to 300 parts of a solvent and brushed, sprayed, or wiped into the mold surface, the residual amount of hydrocarbon wax and sodium di(2-ethylhexyl) sulfosuccinate remaining on the mold surface when dry is sufficient to provide easy release for up to ten mold cyclings. The solvents must be capable of dissolving both the wax and the sodium di(2-ethylhexyl) sulfosuccinate and may be chosen from a wide range of solvents for example ketones, such as acetone, methyl isobutyl ketone and diacetone alcohol; ethers such as ethyl ether and tetrahydrofuran; esters such as ethyl acetate, n-butyl acetate, methyl cellosolve acetate, amyl acetate; ether-alcohol combinations as methyl cellosolve, cellosolve, and butyl cellosolve; alcohols such as ethyl alcohol, isopropyl alcohol, and cyclohexanol; hydrocarbons such as benzene, toluene, xylene, naptha, and turpentine; chlorinated solvents such as ethylene dichloride, carbon tetrachloride, trichloroethylene and miscellaneous types such as carbon disulfide and pyridine. All of these solvents may be utilized in this invention provided they will solubilize the specific hydrocarbon wax as well as sodium di(2-ethylhexyl) sulfosuccinate. The choice of solvent is fully within the ambit of one skilled in the art and, therefore, is fully contemplated herein.

The thin film of liquid mixture may be applied to surfaces of the open or close-top mold in a variety of ways such as by spraying, wiping, dipping, brushing, flooding, knife coating, etc. Since the prime requisite in this aspect of the invention is to apply a thin film of liquid mixture to the mold walls, it is sufficient that any type of application technique be used as long as a thin film is deposited thereon.

After the thin film of liquid is applied to the mold surfaces, the film is dried by driving off the solvent. This may be accomplished by virtually any method as long as the thin film is not disturbed and includes such processes as air drying and oven heating.

As to the method of using the prepared mold, one injects a mixture of flexible polyurethane foam reactants into the mold from a hand held container or a foam machine nozzle; the reactants will react and develop into an integral-skin foam. Part of the technique of producing an integral-skin foam is to control the surface temperature of the mold generally to around 105°F. Once the integral-skin foam is formed, it is cured either partially or fully in the mold by application of heat, and then removed from the mold and washed with water to remove the minuscule traces of mold release mixture. Curing may also be accomplished by placing the mold containing the foam in an oven, directing dielectric energy into the mold, or formulating the integral-skin foam so that it will cure at the residual mold temperature.

The integral-skin foam article is thereafter gently removed from the mold, usually by hand and sent on for further processing such as further curing, painting, finishing, etc. The foam experiences near perfect release from the mold surface when using the aforedescribed combination of polytetrafluoroethylene coating and mold release agent.

The combination of the aforedescribed hydrocarbon wax and sodium di(2-ethylhexyl) sulfosuccinate forms such a tenacious film on the polytetrafluoroethylene coated mold surface that very little is lost to the integral-skin foam article. However, that minuscule amount lost is easily washed from the foam article with water. This aspect of the invention is extremely popular with integral-skin foam molders as prior art mold release agents required expensive solvent washes with such materials as benzene, xylene, trichloroethylene, turpentine, etc., that are not only hazardous to use but tended to deteriorate the quality of the foam in the article.

The following examples are provided to demonstrate how to practice the invention and to show some of the beneficial aspects thereof and are not to be construed singly or in combination as limiting the application, use, or scope of this invention. Unless otherwise noted, all parts are in parts by weight and all percentages are percentages by weight.

EXAMPLE 1

The following example was a test of a number of different conventional mold release agents to determine their effect on the integral skin, their relative release power; and their effect on an overlying coat of paint that was applied to the molded item. A 12 × 12 × 1 inch smooth surfaced, aluminum foam mold was divided into halves by a verticle wall. Different mold release agents were wiped on the mold surfaces, see Table 1b. A hand mixed, polyurethane integral-skin foam formulation was prepared according to the recipe in Table 1a.

The mixture of foam reactants was deposited in the mold, that was heated to 105°F., permitted to foam, and then partially cured at room temperature for 10 minutes. The samples were removed from the mold by hand and judged as to appearance. One-half of each sample was steam cleaned (the other was not cleaned) and a coat of conventional urethane top finish applied over the integral skin of each sample. The round end of a paper clip was rubbed over the dried painted surface under moderate pressure to determine the degree of adhesion to the underlying integral-skin; the cycles of number of passes were counted until the paint flaked or peeled. Another portion of the foam was then subjected to rolling with a 1¼ inch diameter steel roller having 25 pounds of weight placed thereupon and run at 30 cycles per minute with a 5 inch stroke; the cycles were counted until the paint flaked or peeled. Additionally, each of the samples was judged as to presence and amount of pinholes on the skin. Below in Table 1b, appear the results of these tests:

Table 1a

| Foam Ingredients | Parts |
| --- | --- |
| 4500 MW polyoxypropylene triol (polyol) | 100.00 |
| Methylene bis o-chloro aniline (chain extender) | 20.00 |
| Dibutyl tin dilaurate (catalyst) | 0.10 |
| Triethylenediamine (catalyst) | 1.50 |
| Freon 11 (blowing agent) | 25.00 |
| Toluene diisocyanate (80/20:2,4/2,6 isomer ratio) (polyisocyanate) | 66.00 |

Table 1b

| Mold Release Agent | Steam Cleaned | Painted Appearance | Paper Clip Adhesion test cycles to flaking | Roller Test cycles to failure | Pinholes in skin | Remarks |
|---|---|---|---|---|---|---|
| Chem-Trend P5Cl (diluted 40/1 with napthene solvent) | yes | good | 15-20 | | none | paint does not strip, removal slightly difficult |
|  | no | good | 15-20 | | none | |
| Freecote 33, a modified polydimethyl siloxane such as a sodium methyl siliconate in a solvent system of water and 1,4-dioxane. | yes | poor | parts stuck in mold and tore | | many | |
|  | no | poor | parts stuck in mold and tore | | many | |
| Contour Nonsticking stoffe, a 2-component room temperature curing silicone rubber composition. | yes | poor | poor paint wetting | | many | poor release |
|  | no | poor | poor paint wetting | | many | poor release |
| Chem-Trend B-1 (x), about 0.4% solids of a mixture of calcium oleate plus small amounts of calcium palmitate and calcium laurate in perchloroethylene. | yes | poor | poor paint wetting | | many | |
|  | no | poor | poor paint wetting | | many | |
| General Electric SR 418, a silicone resin based composition. | yes | good | 7-10 | 9000 | few | |
|  | no | good | 7-8 | 9000 (almost) | | |
| Bruline X-15 B, a lacquer type mold release agent. | yes | good | 5-7 | 5000 | none | paint is stripable |
|  | no | good | 5-7 | | none | |
| Axel Products F-57, a long chain fatty acid soap emulsified polytetrafluoroethylene in an aromatic solvent system. | yes | good | 2-4 | | none | |
|  | no | good | 2-4 | 3000 | none | |
| Percy Harms Inc. Slide, a water soluble polyethylene glycol fatty acid ester such as a polyethylene glycol sorbitan fatty acid ester. | yes | good | 10-25 | 5000 | few | |
|  | no | good | 20-30 | 9000 | few | |
| Axel Products 252-C, a fatty acid isopropanol amide in water. | yes | good | 2-3 | 1300 | few | |
|  | no | good | 1-3 | 450 | few | |
| Brulin X-15A, a lacquer type mold release agent. | yes | good | 6-8 | 9000 | none | paint is stripable |
|  | no | good | 7-10 | 4200 | none | paint is stripable |

This example demonstrates the wide variation in results with conventional mold release agents with respect to an integral-skin formulated polyurethane foam. From these results it is noted that only P5C1 permits development of integral-skin foams without any pinholes, does not affect subsequent painting whether water washed or not, and permits good paint adhesion to the skin. P5C1 is a mold release agent marketed by Chem-Trend, Inc., Howell, Michigan and contains about 89.4 percent solvent, about 2.6 percent sodium di(2-ethylhexyl) sulfosuccinate, and about 8.0 percent hydrocarbon wax having a melting point of 210°F., zero acid number, and zero saponification number.

EXAMPLE 2

A polished steel close-top mold was cleaned and dried. The mold was heated to 105°F. and injected with a mixture of polyurethane integral-skin foam reactants similar to that in Example 1. After foaming was complete, the mold was heated to 120°F. for 30 minutes to cure the foam then cooled to room temperature and opened. The flexible polyurethane integral-skin foam could not be removed from the mold without tearing the skin.

EXAMPLE 3

A polished steel close-top mold was cleaned and then coated with a thin continuous layer of polytetrafluoroethylene polymer powder and fused at 400°C. into a clear, smooth coating. The mold was thereafter heated to 105°F. and injected with a charge of foam reactants similar to that of Example 1. The foam was cured, cooled, and the mold opened as in Example 2. The flexible integral-skin foam could not be removed without causing small ruptures in the skin. In addition, there were numerous small pinholes in the skin.

EXAMPLE 4

A Nedox processed polytetrafluoroethylene coated close-top mold was coated (sprayed) with a thin film of a liquid mixture comprising (by weight) one part of a hydrocarbon wax having a melting point of 210°F. an acid number of zero and a saponification number of zero, one part of sodium di(2-ethylhexyl) sulfosuccinate, and three parts of a solvent comprising 67 weight percent naphthene solvent, 23 percent paraffinic solvent, and 10 percent aromatic solvent, that dissolved both components, and the coating dried by heating the mold in a forced air circulating oven until the mold temperature reached 105°F. A charge of flexible polyurethane integral-skin foam reactants similar to that in Example 1 was injected into the mold. The developed foam was cured and cooled as in Example 1 and the mold opened. The flexible integral-skin foam was easily removed from the mold but had a pitted and pockmarked surface.

EXAMPLE 5

Example 4 was repeated except that the liquid mold release mixture was further diluted with solvent to a ratio of one part wax, 3 parts sodium di(2-ethylhexyl) sulfosuccinate, and 328 parts solvent. The cured foam released easily from the mold and showed no signs of rips, tears, or pin holes. Upon washing the article with water, drying it, and painting the integral-skin with a typical urethane based paint, it was noted that the paint adhered tightly to the skin and showed no signs of wrinkling, crinkling, or blistering.

This example shows the efficacy of the combination of the hydrocarbon wax, sodium di(2-ethylhexyl) sulfosuccinate and solvent, and the smooth polytetrafluoroethylene polymeric coating on the mold surface to allow proper development of an integral skin in-situ on the surface of the foam article and then to permit pinhole-free and rip and tear-free foam to be removed from the mold.

What is claimed is:

1. A method of preparing a mold to release flexible polyurethane integral skin foam comprising:
   a. applying a continuous coating of a fused polytetrafluoroethylene polymer to the mold surfaces;
   b. applying a thin film of a liquid mixture comprising (by weight) from 1 to 10 parts of a hydrocarbon wax having a melting point of from about 200° to 220°F., an acid number of about zero, and a saponification number of about zero, from 7 to 26 parts of sodium di(2-ethylhexyl) sulfosuccinate, and from 330 to 300 parts of a solvent for said wax and said sodium di(2-ethylhexyl) sulfosuccinate over said coating; and,
   c. drying said film prior to injecting the mixture of foam reactants into the said mold.

2. The method of claim 1 wherein said melting point of said wax is 210°F.

3. A method of molding flexible polyurethane integral-skin foam, free of surface pinholes and ruptures, comprising:
   a. applying a continuous coating of a fused polytetrafluoroethylene polymer to the mold surfaces;
   b. applying a thin film of a liquid mixture comprising (by weight) from 1 to 10 parts of a hydrocarbon wax having a melting point of from about 200° to 220°F., an acid number of about zero, and a saponification number of about zero, from 7 to 26 parts of sodium di(2-ethylhexyl) sulfosuccinate, and from 330 to 300 parts of a solvent for said wax and said sodium di(2-ethylhexyl) sulfosuccinate over said coating;
   c. drying said film,
   d. injecting a mixture of flexible polyurethane foam reactants into said mold containing said dried film to react and produce an integral skin foam;
   e. curing said integral-skin foam in said mold;
   f. removing said cured integral-skin foam from said mold; and,
   g. washing said foam with water to remove traces of said mixture.

* * * * *